United States Patent
Hikita (10) Patent No.: US 6,414,816 B2
(45) Date of Patent: Jul. 2, 2002

(54) CARTRIDGE FOR CLEANING FEEDER BELT AND LIBRARY APPARATUS

(75) Inventor: Minory Hikita, Suzaka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/808,187

(22) Filed: Mar. 15, 2001

Related U.S. Application Data (63) Continuation of application No. PCT/JP98/04146, filed on Sep. 16, 1998.

(51) Int. Cl.$^7$ .............................................. G11B 15/18
(52) U.S. Cl. ...................... 360/92; 360/137; 369/30.38; 369/30.4; 15/1
(58) Field of Search ........................ 360/92, 965, 137; 369/30.38, 30.4, 30.43, 30.45; 15/1; 901/294; 441/8

(56) References Cited

U.S. PATENT DOCUMENTS

| | | | | |
|---|---|---|---|---|
| 5,228,022 A | * | 7/1993 | Compton et al. | 369/72 |
| 5,607,275 A | * | 3/1997 | Woodruff et al. | 414/331 |
| 5,793,584 A | * | 8/1998 | Knight et al. | 360/133 |
| 5,858,140 A | * | 1/1999 | Berger et al. | 156/62.2 |
| 6,104,564 A | * | 8/2000 | Shibuya et al. | 360/69 |
| 6,144,520 A | * | 11/2000 | Ymakawa et al. | 360/92 |

FOREIGN PATENT DOCUMENTS

| | | |
|---|---|---|
| JP | 3-2463 | 1/1991 |
| JP | 4-132646 | 12/1992 |

* cited by examiner

*Primary Examiner*—Allen Cao
*Assistant Examiner*—Dzung C. Nguyen
(74) *Attorney, Agent, or Firm*—Armstrong, Westerman & Hattori, LLP (57) ABSTRACT

A library apparatus accommodating a number of cartridges containing memory mediums is used for automatically cleaning a hand of an accessor robot that transfers a plurality of cartridges and is provided in the library apparatus. A control unit is provided to control the movement of the accessor robot. The control unit counts the number of times the hand is used to determine when the hand is to be cleaned.

2 Claims, 8 Drawing Sheets

CARTRIDGE FOR CLEANING FEEDER BELT AND LIBRARY APPARATUS

This application is a continuation of international application PCT/JP98/04146, filed on Sep. 16, 1998.

BACKGROUND OF THE INVENTION

The present invention relates to a library apparatus to store many cartridges for accommodating memory media. A library apparatus is a so-called information processor to record and read the data to and from a desired cartridge accommodating a memory medium.

In more detail, the present invention relates to a library apparatus for automatically cleaning a hand of an accessor robot for transferring a plurality of cartridges provided in the library apparatus.

DESCRIPTION OF THE RELATED ART

A library apparatus can accommodate a plurality of cartridges accommodating a memory medium such as a magnetic tape or an optical disc or the like. The library apparatus comprises a cartridge access station (CAS) for loading and exhausting a cartridge, a cell unit including a plurality of cells to store the loaded cartridges and a drive unit for executing the processes such as recording and reproduction of information to and from a medium of the cartridge.

Transfer of cartridge within the library apparatus, namely transfer of cartridge between the cell and drive unit and transfer of cartridge between CAS and cell are executed with the accessor robot having a pair of hands to hold a cartridge. The accessor robot is provided to run by itself within the library apparatus.

The accessor robot holds a cartridge allocated in the CAS and cell explained above by holding it with a pair of hands.

A pair of hands to hold the cartridge is provided with a cartridge pulling member to rotate around the external circumference thereof. Usually, as this pulling member, a rubber material is used to make it easier to hold the cartridge. Therefore, a friction coefficient between the holding surface of hands and the cartridge can be enhanced.

After holding the cartridge, the hand rotates the rubber material to pull out the cartridge from the cell or the like.

Moreover, when a cartridge is to be stored to the cell or the like, the hand is provided opposed to an aperture such as the cell to rotate the rubber material in the opposite direction.

DISCLOSURE OF THE INVENTION

In a large size library apparatus, the cartridge is transferred for several thousands of times a day with the accessor robot. At the time of this transfer, dusts adhered to the cartridge is gradually adhered to the rubber material of the hand provided to the accessor robot and is then deposited.

When dusts are adhered as explained above, the friction coefficient of the rubber material is lowered. Therefore, the cartridge can no longer be pulled out easily with the hands. Otherwise, there is also a fear that the cartridge is dropped from the accessor robot in the course of the transfer of the accessor robot.

If the cartridge cannot be pulled out, it is a serious defect of the library apparatus. Moreover, not only the cartridge dropped from the accessor robot may be broken with the mechanical operation of the internal devices but also the memory medium itself stored in the cartridge may be broken, resulting in the fear that a serious fault such as missing of data may be generated.

In view of eliminating such unexpected fault, operation of the apparatus is stopped in current for the purpose of maintenance of apparatus when a constant period has passed. While the operation is stopped, a maintenance person can eliminate dusts by cleaning the surface of rubber material of the hands with a solvent such as alcohol or the like.

However, this method inevitably interrupts the operation of the information processing system to which a library apparatus as the maintenance object is connected and therefore workability is remarkably deteriorated.

Moreover, in these years, continuous operations of the information processor are generally executed and it is difficult to suspend the information processing system by stopping the library apparatus. For example, in some cases, it is required to continuously execute the work for six months and unexpected trouble may probably be generated because it is difficult to prepare the time for maintenance.

SUMMARY OF THE INVENTION

The present invention has been proposed to solve such problems and it is therefore an object of the present invention to provide a library apparatus for conducting the automatically cleaning to the rubber material of the hand.

The present invention is provided with the following structure to attain the object explained above. Namely, the library apparatus of the present invention is provided with a special cartridge for cleaning the hand in the cell unit comprising a plurality of cells to accommodate the cartridge to store the memory media. This cartridge has a structure, unlike an ordinary cartridge, that cannot be pulsed out from the cell.

Therefore, when the accessor robot tries to pull out the special cartridge for cleaning from the cell, the rubber material and cartridges execute relative movement while these are placed in contact.

Thereby, the cleaning to eliminate dusts adhered to the surface of the rubber material of hands can be realized.

Moreover, the library apparatus of the present invention is provided with a control unit to control the movement of the accessor robot. This control unit counts up the number of times of holding of the cartridge with the accessor robot. It is just preferable to control the accessor robot to clean the rubber material of hands when the number of times has reached the preset number of times.

According to the library apparatus of the present invention, the rubber material provided to the external circumference of the hand can be cleaned automatically. Therefore, the cartridge can surely be held with the hands. Accordingly, an accident such as drop of cartridge can be prevented to improve reliability. As a result, troublesome maintenance can be reduced thereby to improve workability.

In above figures,

10 . . . library apparatus;
12 . . . accessor robot unit;
13 . . . Cell rack;
13a . . . Cell;
14 . . . Accessor robot unit;
15, 16, 17 . . . path unit;
18, 19 . . . drive unit;
20 . . . drum unit;
21 . . . control unit;
22 . . . CAS;
23 . . . loading port;
24 . . . exhausting port;
25 . . . rail;
27 . . . accessor robot;
28 . . . rail base;
29 . . . vertical column;
30 . . . hand assembly;
31 . . . cell drum;
42 . . . hand unit;
43 . . . hands;
44 . . . hand guide plate;
45 . . . rubber material;
46 . . . hand switching motor;
47 . . . hand switching shaft;
48 . . . cartridge;
49 . . . hand switching plate;
50 . . . cleaning cartridge;
51 . . . cleaning member;
52 . . . stopper;
53 . . . hole for screwing;
54 . . . water supplying port;
61 . . . recess for holding cartridge;
62 . . . cell;
63 . . . side surface of cell drum;
64 . . . side surface of cartridge;
65 . . . side surface of cell drum;
66 . . . inner most surface of recess for holding the cartridge.

DESCRIPTION OF THE PREFERRED EMBODIMENT

A preferred embodiment of the present invention will be explained in detail with reference to the accompanying drawings.

Figure 2:
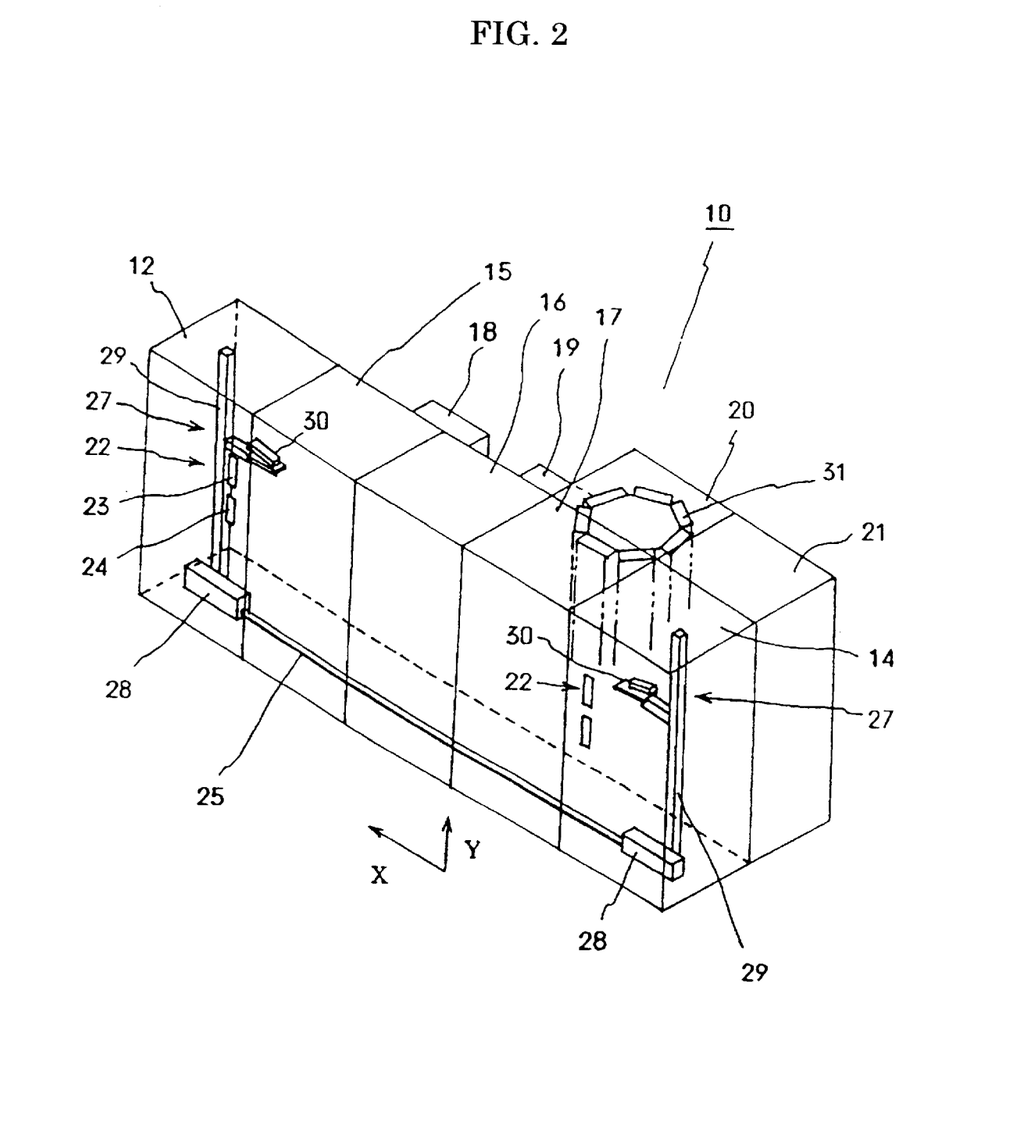
FIG. 2 is a schematic perspective view of the library apparatus.

FIG. 2 is a schematic perspective view illustrating an example o the library apparatus 10. This library apparatus 10 is provided at both ends with accessor units 12, 14 wherein the accessor robot 27 is saved.

Between these two accessor units 12, 14, path units 15, 16, 17 are allocated. At the side surface that is parallel to the longitudinal direction of the library apparatus 10 of the path units 15, 16, the drive units 18, 19 are provided. To the drive units 18, 19, a magnetic tape drive is mounted to conduct data read and write operation for the recording medium stored in the cartridge.

The path unit 17 is also provided with a drum unit 20 in addition to the drive unit.

Figure 3:
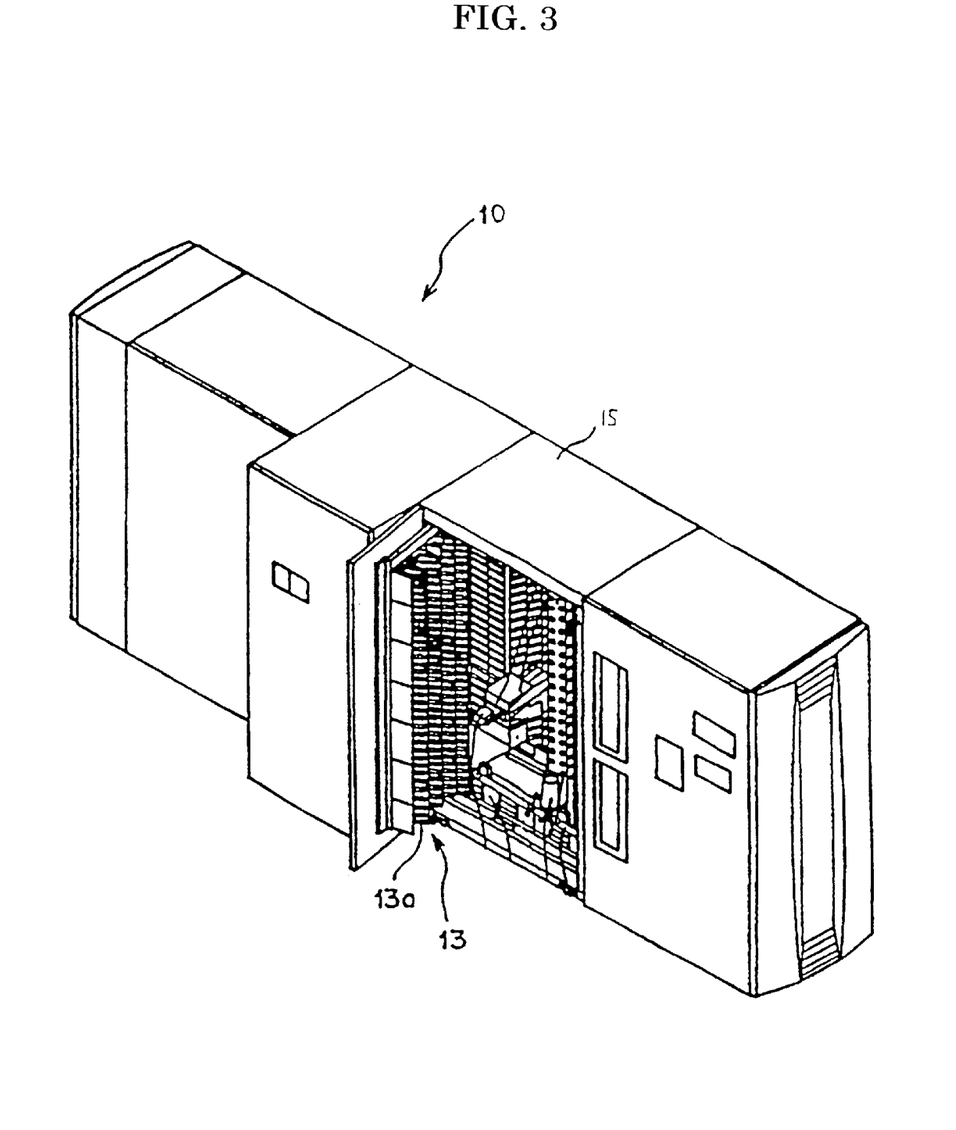
FIG. 3 is a schematic perspective view of the library apparatus.

Moreover, the library apparatus 10 sometimes introduces also a structure as illustrated in FIG. 3. In FIG. 3, a cell rack 13 is provided with a cell rack 13 at the side surface parallel to the longitudinal direction of the library apparatus 10 of the path unit 15. The cell rack 13 is allocated in the flat condition at the side surface door of the path unit 15. The cell rack provided to one path unit 15 has a structure having the cells 13a, for example, of the 49 stages in the vertical direction and 5 stages in the lateral direction.

Returning to FIG. 2, the library apparatus 10 is provided with a control unit 21 to control the accessor robot 27 explained above.

Each of the accessor units 12, 14 has a cartridge access station (CAS) 22 at the front surface side. Each CAS 22 has a cartridge loading port 23 and an exhausting port 24.

Between both accessor units 12, 14, a rail 25 is allocated through the path units 15, 16, 17. The rail 25 becomes a running path of the accessor robots 27, 27. The accessor robot is guided with the rail 25 to move within the library apparatus 10 in the X direction.

Each accessor robot 27 has a rail base 28, a vertical column 29 and a hand assembly 30.

The rail base 28 is a drive mechanism to cause the accessor robot to run along the rail 25.

The vertical column 29 is extended toward the upper side in vertical against the rail 25 and is fixed to the rail base 28.

The hand assembly 30 has a structure to freely move in the vertical direction (Y direction) along the vertical column 29.

The drive structure (not illustrated) of the rail base 28 can be attained with the well known device such as motor, pinion and rack (provided in the side of rail 25). The hand assembly 30 can also be provided to freely move in the vertical direction with the well known mechanism. For example, the timing belt (not illustrated) is coupled with sprockets provided at the upper and lower sides of the vertical column 29 and this timing belt is then driven with a motor.

Figure 4:
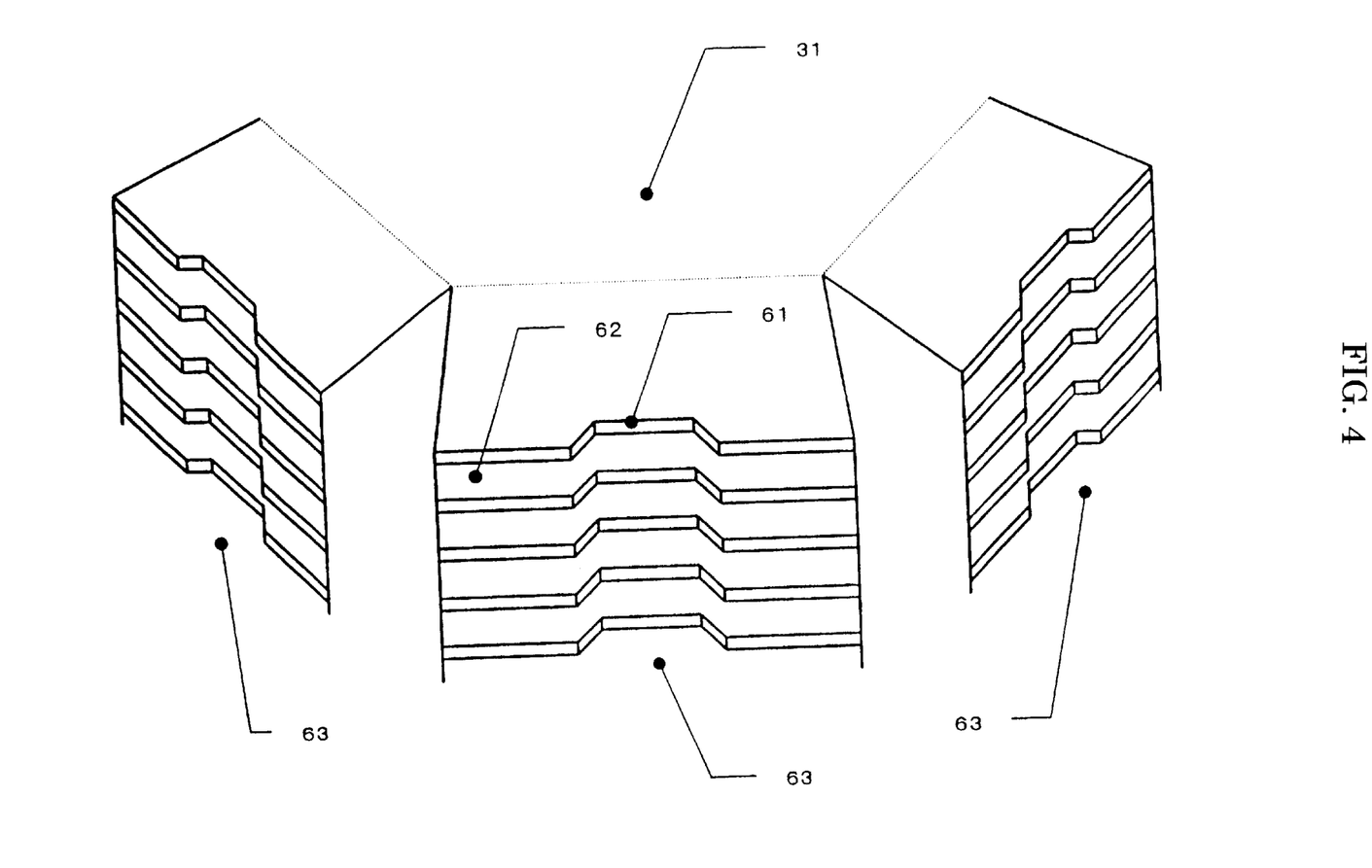
FIG. 4 is a perspective view of the cross-sectional view of a cell- drum.

The drum unit 20 has a cell drum 31 including a plurality of cells 62. FIG. 4 is a perspective diagram illustrating a part of the cross-section of the cell drum 31 provided in the drum unit 20.

The cell drum 31 is formed as a polygonal column having the polygonal cross-section. At each side surface 53 of the polygonal column, many cells are provided. Within each cell, a cartridge to accommodate the magnetic tape is loaded.

Figure 5:
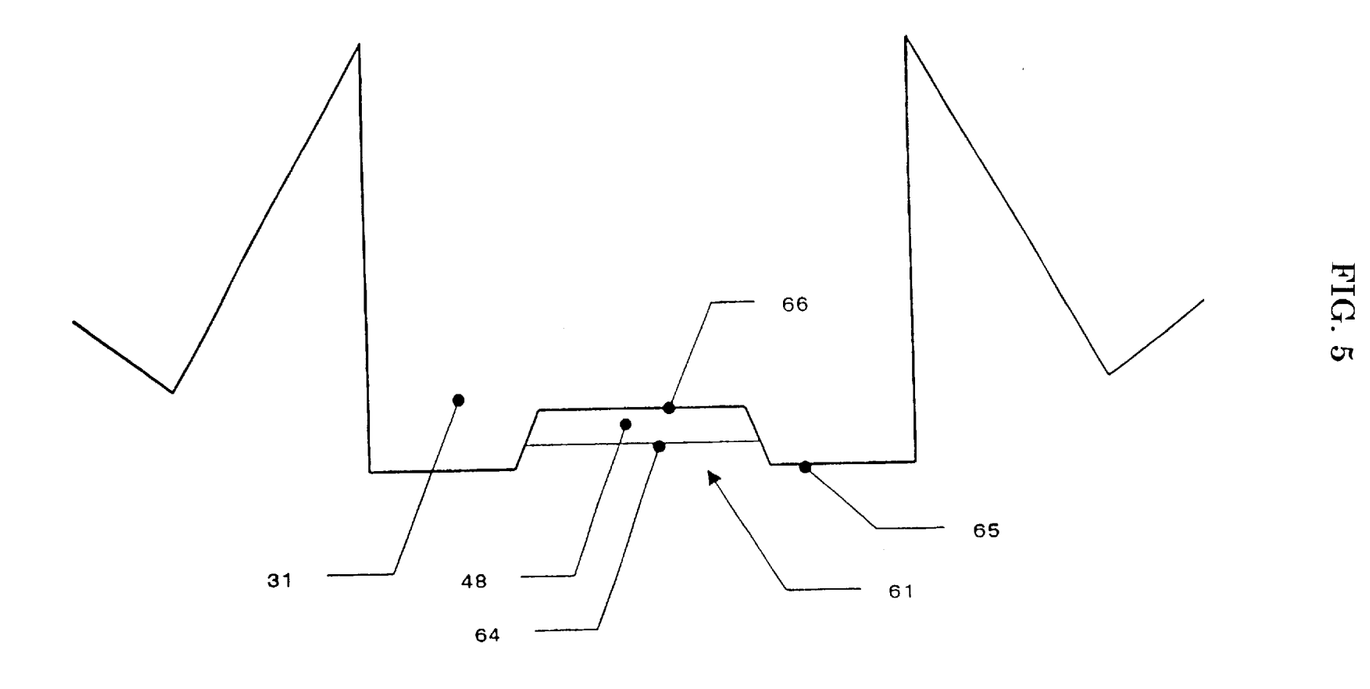
FIG. 5 is a plan view in the case where a cartridge is inserted to a cell.

The upper and lower surfaces of each cell are provided at a part thereof with an area 61 recessed than the side surface. This recess is used for holding the cartridge stored in the cell with the hands provided with the accessor robot. For easier understanding, a plan view of the cell storing the cartridge is illustrated in FIG. 5.

Namely, under the condition that the cartridge is stored in the cell, the end face 64 in the aperture side of the cartridge is located at the center side than the side surface 65 of the cell drum and at the external side of the inner-most surface 66 of the recess 61 provided at the upper surface and temporary surface of the cell. Accordingly, the hands can hold the part at the external side than the inner-most surface 66 of the recess and then rotate the rubber material provided at the external circumference of the hands in order to pull out the cartridge.

The cell drum 31 can rotate around the axial line of the drum.

Each drive unit 18, 19 has, for example, a plurality of (four units, for example) the tape drive units (not illustrated). Each tape drive unit has a cartridge loading and exhausting port. When a cartridge is loaded to the cartridge loading/exhausting port, the tape drive unit records or reproduce the information to or from the magnetic tape accommodated in the loaded cartridge.

The accessor robot 27 moves by itself depending on the instructions from the control unit provided in the control unit 21. The accessor robot transfers the cartridge between the loading port 23/exhausting port 24 of the CAS 22 and the cell of the cell drum 31 and between the cell and the loading/exhausting port of the tape drive unit. This transfer operation is controlled with the control unit in the control unit 21 explained above.

Figure 6:
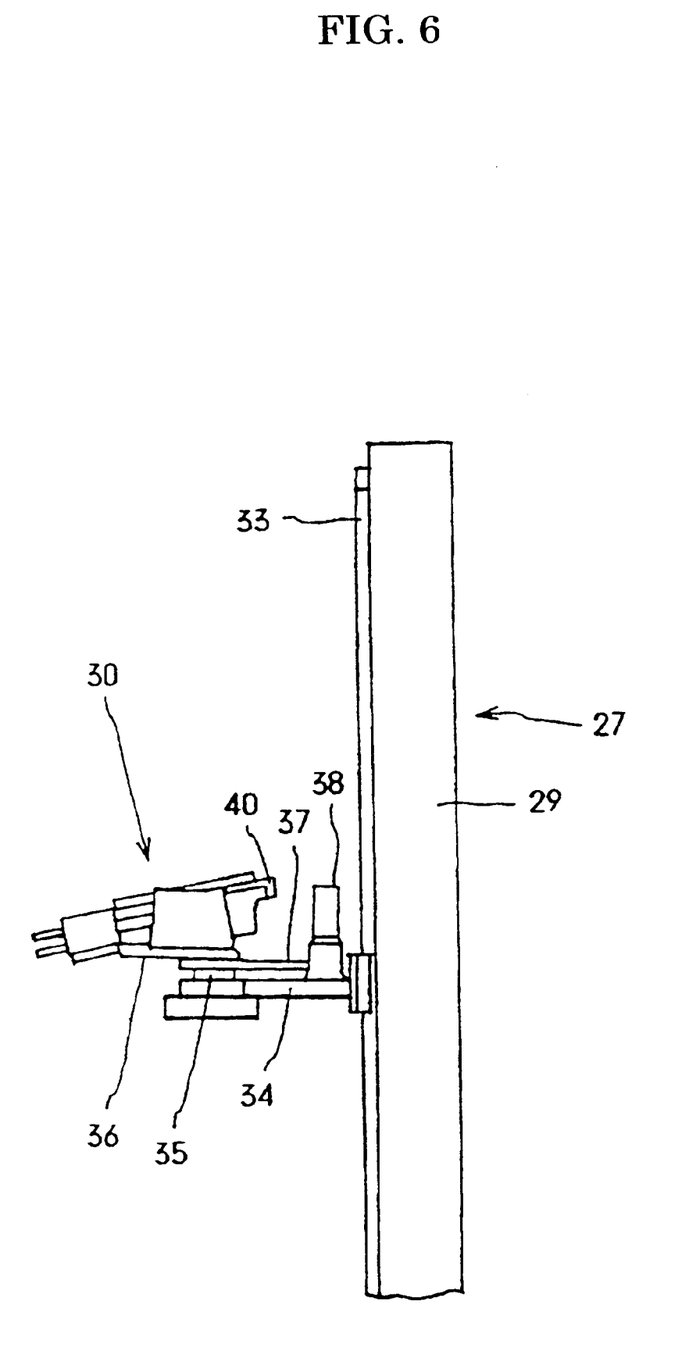
FIG. 6 is a side elevation diagram of the upper part of the accessor robot.

FIG. 6 is a side elevation diagram at the upper part of the accessor robot 27 illustrated in FIG. 2. A hand assembly 30 is mounted on a supporting base 34. The supporting base 34 moves in the vertical direction along a guide rail 33 formed at the vertical column 29.

The front end side of the supporting base 34 is provided with a rotating shaft 35 that rotates in vertical against the supporting base 34. To this rotating shaft 35, a mount base 36 of the hand assembly 30 is attached. When a timing belt 37 extended over the rotating shaft 35 and the output shaft of a motor 38 provided on the supporting base 34 is driven with the motor 38, the mount base 36 rotates. Since the mount base 36 and hand assembly 30 are fixed, the hand assembly 30 can also rotates within the horizontal plane.

Figure 7:
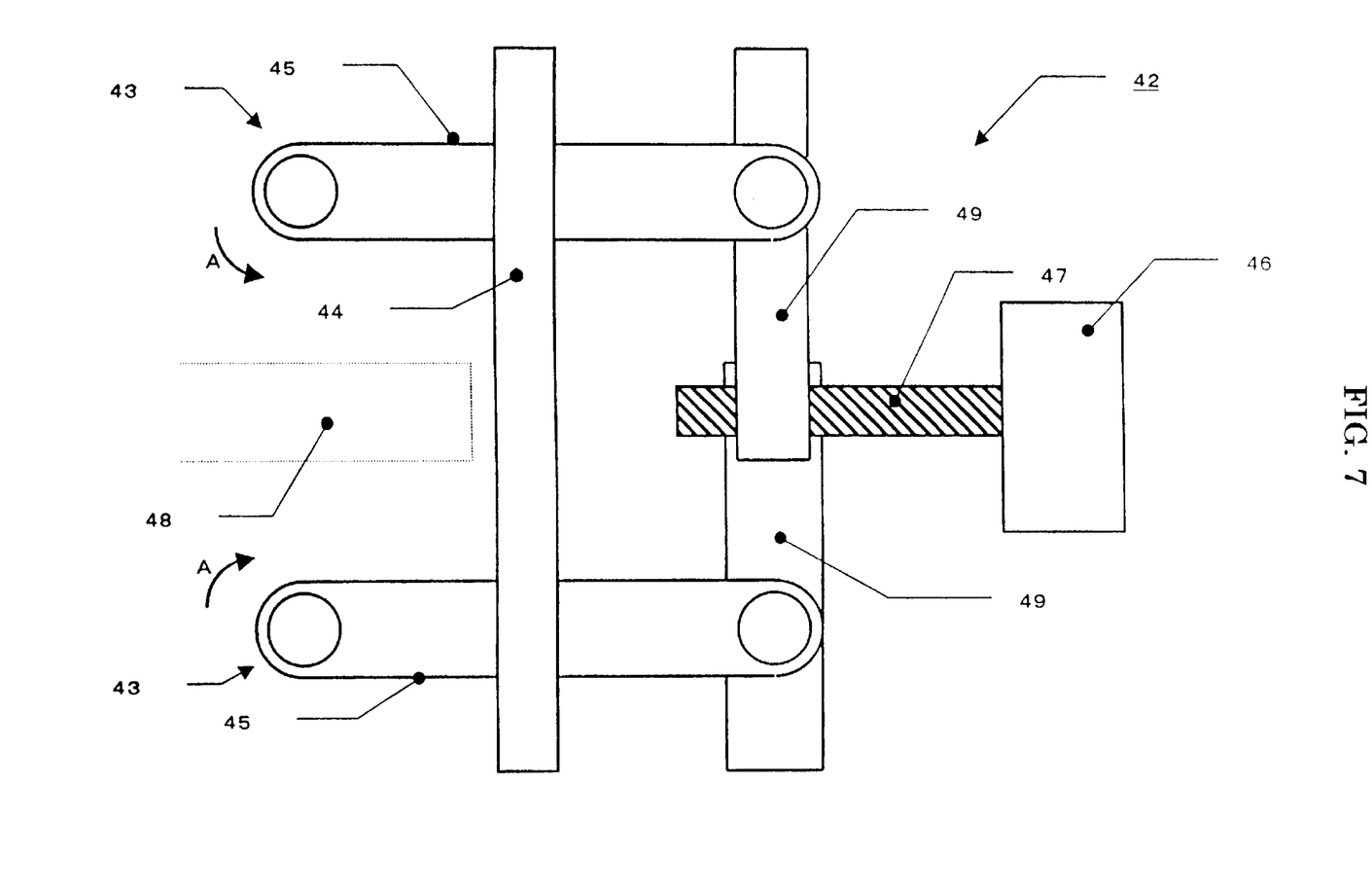
FIG. 7 is a plan view of the hand unit.

FIG. 7 is the side elevation diagram schematically illustrating the hand unit 42 of the hand assembly 30.

The hand unit 42 has a pair of upper and lower hands 43, 43 that are supported to open or close. The hands 43, 43 are provided with rubber materials 45, 45 that can rotate at the external circumference of hands. The hands 43, 43 have the structure that can be opened or closed when the motor 46 is driven. When the motor 46 rotates, a shaft 47 also rotates via a gear not illustrated. The shaft 47 has a groove of screw type and is engaged with the groove provided on an opening/closing plate 49. Therefore, with rotation of the shaft 47, the opening/closing plate moves in the vertical direction of the figure. Therefore, the hand 43 fixed to the opening/closing plate 49 opens or closes.

Moreover, a guide plate 44 is also provided to prevent that an angle formed with both hands is deviated when the hand 43 opens or closes. The hand is provided with a projection. This projection has a structure to be engaged with the recess provided to the guide plate 44.

When it is requested to take out the cartridge from the cell, the control unit locates first the hands 43, 43 to the position as illustrated in FIG. 7 where the hand covers the end part of the cartridge. After the hands are located as explained above, the control unit instructs the drive of the motor 46 to operate the hand in the closing direction. The hands holds the cartridge 48 from the upper and lower directions. The hands 43, 43 take out the cartridge from the cell by rotating the burrer bands 45, 45 provided at the external circumference in the direction A after holding the cartridge.

The opening/closing mechanism of the hands 43, 43 is of course never limited to the mechanism explained above.

Figure 8:
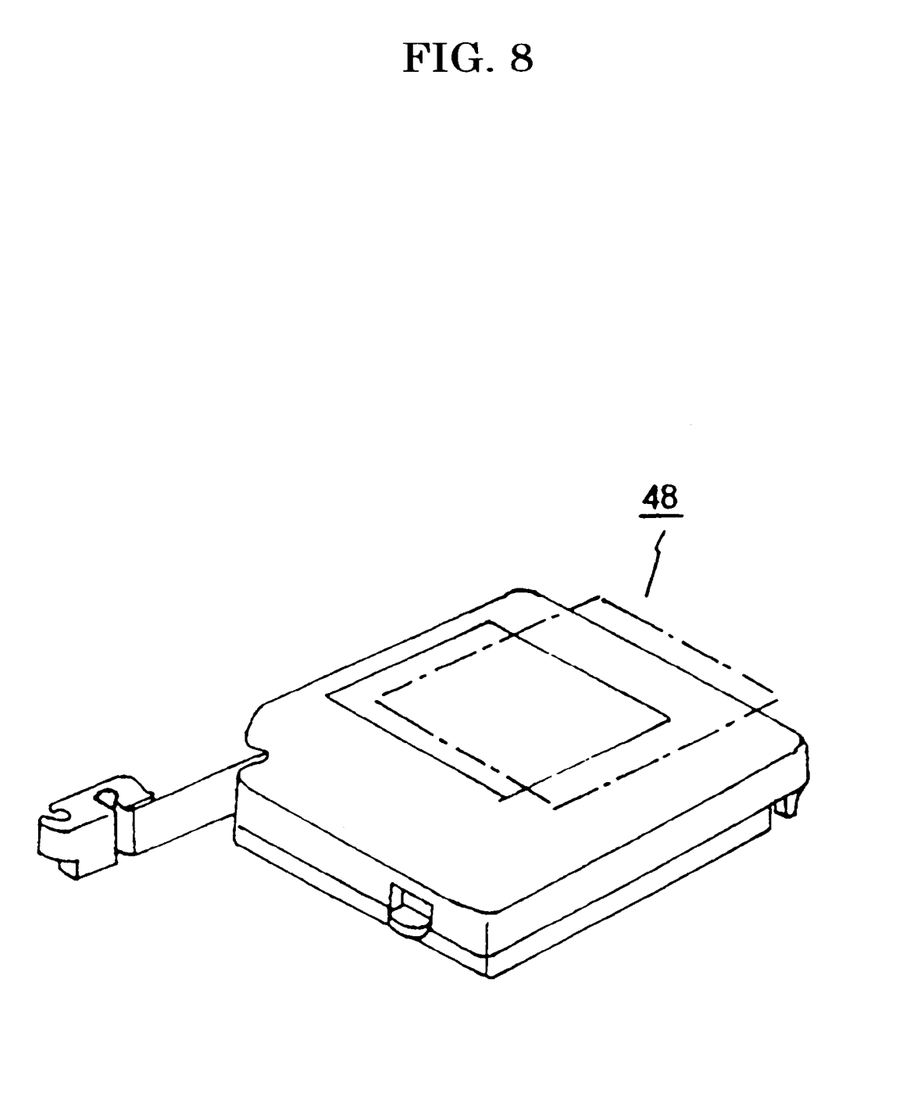
FIG. 8 is a schematic perspective view of the cartridge.

FIG. 8 is a diagram for explaining an example of the cartridge 48 accommodating a magnetic tape. The cartridge 48 is held, when it is transferred, from the upper and lower directions at the area indicated with a broken line in the figure with the hands 43, 43. Namely, it can be understood that the cartridge can be held, transferred and released freely with movement of accessor robot 27 along the rail 25, spiral rotation of hand assembly 30, holding and release with hands 43, 43, drawing operation of the cartridge.

The accessor robot 27 is controlled with the control unit.

Figure 1:
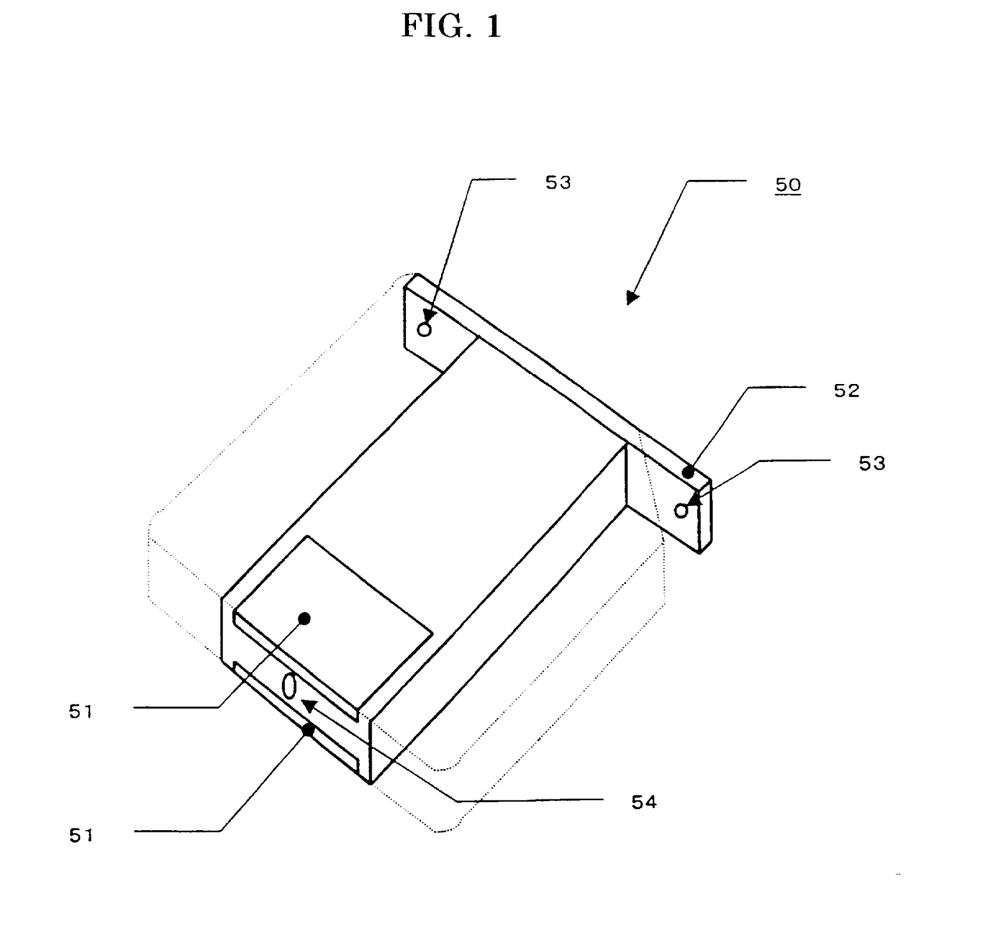
FIG. 1 is a perspective view of the cartridge to be cleaned with the library apparatus of the present invention.

In this embodiment, the cleaning cartridge 50 illustrated in FIG. 1 is allocated and fixed to any one of many cells. In FIG. 1, the cleaning cartridge in relation to this embodiment is indicated with a solid line. Moreover, the shape of an ordinary cartridge is indicated with a dotted line for easier understanding of the size of the cleaning cartridge.

The size in the longitudinal direction (depth) of the cleaning cartridge is equal to that of an ordinary cartridge and thickness of the cleaning cartridge is also equal to that of an ordinary cartridge. It is enough when width of the cleaning cartridge is equal to at least the width of the hand or more.

With introduction of such structure, the accessor robot 27 can hold the cleaning cartridge 50 with the hands 43, 43 depending on the operation explained above without discrimination from an ordinary cartridge.

Moreover, since the cleaning cartridge is also provided with a stopper 52 because it must not be pulled out with the operation of hands. The stopper 52 is a member for fixing the hands and cell. In this embodiment, the hand and cell are fixed with the screwing. Therefore, the stopper is provided with a hole 53 for the screwing. The cleaning cartridge is fixed to the deep wall of the cell using the screwing hole 53.

A part of hand for holding the cleaning cartridge when it is stored in the cell is provided with a cleaning member 51. This cleaning member 51 is provided at the front and rear surfaces of the cleaning cartridge. A size of the cleaning member is enough when it is larger than the part in contact with the cartridge when the hands hold the cartridge.

As the cleaning member, a polishing material such as a sand-paper or the like is used as the member of the simplified structure.

Otherwise, a humidity absorbing material such as a cloth may also be used. In this case, the inside of the cleaning cartridge is formed as a cavity and this cavity is filled with a cleaning solvent such as water. The cleaning cartridge is provided with a water injecting port 54 for reserving the cleaning solvent. The cleaning member such as cloth shall be in contact with the cleaning solvent within the cartridge. Thereby, the cleaning solvent is always supplied to the cleaning member through the capillary effect.

The hands 43, 43 hold the cleaning cartridge and thereafter try to pull out this cartridge. However, since the cleaning cartridge is fixed to the cell, it cannot be taken out from the cell. Therefore, the rubber material provided at the external circumference of the hands scrubs the cleaning member. Namely, dust adhered to the rubber material around the hands can be removed for the purpose of cleaning the rubber material.

Such cleaning work is not always required. Namely, such cleaning work can be realized after passage of the predetermined period. Such control can be executed with the control unit.

Otherwise, it is also possible that the number of times of select/restore operation in which one cycle of operation is composed of holding, transferring and carrying-in (out) of the cartridge is counted with a counter and such cleaning operation can be executed with the accessor robot when such counted value reaches the preset number of times. Operations in this case can also be controlled with the control unit.

The preferred embodiments of the present invention have been explained above but the present invention is never limited to such embodiments and allows various changes or modifications within the scope of the claims not departing from the spirit of the present invention.

POSSIBILITY FOR USE IN INDUSTRIAL FIELD

As explained above, the library apparatus of the present invention can be utilized as a large capacity memory apparatus operating a part of the information processing system. A cartridge for cleaning a feeder belt is an effective means for improvement in reliability of the large capacity memory apparatus.

Therefore, the present invention belongs to the most active industries in the present highly progressed information society.

Moreover, the cartridge and library apparatus for cleaning a feeder belt of the present invention are not used only to the information system. The present invention has the possibility for use in the field of automatic warehouse.

What is claimed is:

1. An apparatus for cleaning a feeder belt to clean a pair of hands, said apparatus comprising:

a plurality of cells to accommodate a cartridge to store a memory medium;

drive unit for writing and reading data to and from a memory medium;

accessor robot including a pair of hands to hold the surfaces provided opposed with each other of the cartridge for transferring the cartridge between at least one of the cells and the drive unit;

a control unit for controlling said accessor robot, a stopper for fixing said hands to at least one of the cells; and a cleaning member, located on a cleaning cartridge fixed to one of the cells, said cleaning member in contact with said hands when said hands hold the cleaning cartridge.

2. A library apparatus comprising:

a plurality of cells for accommodating a cartridge to store a memory medium;

a drive unit for writing and reading data to and from a memory medium;

an accessor robot including a pair of hands to hold the surfaces provided opposed with each other of a cartridge to transfer the cartridge between at least one of the cells and the drive unit; and a control unit for controlling said accessor robot, whereby said a pair of hands has a pulling member to rotate around the external circumference of each hand and at least one of cells is provided with a fixed cartridge for cleaning the feeder belt.

* * * * *